Nov. 23, 1965

H. L. MacDONELL 3,219,469

PROCESS FOR DETECTING LATENT FINGERPRINTS
AND MATERIAL USEFUL THEREIN

Filed Aug. 8, 1962

INVENTOR.
HERBERT L. MacDONELL
BY
Clarence R. Patty Jr.
ATTORNEY

No. 3,219,469
PROCESS FOR DETECTING LATENT FINGER-
PRINTS AND MATERIAL USEFUL THEREIN
Herbert L. MacDonell, Corning, N.Y., assignor to
Corning Glass Works, Corning, N.Y., a corporation of
New York
Filed Aug. 8, 1962, Ser. No. 215,621
8 Claims. (Cl. 117—.5)

This invention relates to processes for detecting latent prints, such as fingerprints, and to a novel material useful in such processes and in other processes wherein it is desired to effect the controlled release of vapors.

Although, as will be apparent from the following description, the present invention is of broad utility, it will be described with reference to its use in the detection of latent fingerprints by contact with iodine vapor.

In the past, the use of iodine vapors to develop latent fingerprints has been well known and has generally involved either placing an article suspected of having prints thereon in an enclosure containing a quantity of solid iodine and causing the iodine to sublime to produce vapors which contact and develop the latent prints or by producing such vapors and subsequently directing them onto such articles. The former process is slow, and its apparatus is cumbersome, while apparatus utilized in the latter process is subject to deterioration due to chemical attack by the iodine vapors. In both processes substantial quantities of the irritating iodine vapors are released into the atmosphere.

It is an object of the present invention to provide a process for the development of latent fingerprints by an iodine fuming process wherein the above-mentioned disadvantages are eliminated.

It is a further object to provide such a process wherein iodine vapors are released continuously and uniformly over the entire surface of a specimen.

Another object is to provide a novel material for the controlled release of iodine vapors.

These and other objects, which will be apparent from the description, are accomplished by a process wherein an inert porous substance is caused to absorb a quantity of iodine vapor and the resulting material is brought into close proximity with a surface which is to be examined for fingerprints.

Since iodine vapor is collected by various porous substances by both absorption and adsorption, these two processes will be hereinafter referred to both jointly and severally by forms of the term "absorb."

The invention will be described with reference to the accompanying drawing, in which.

Although numerous porous materials are capable of absorbing iodine vapors and subsequently releasing them, the present applicant has found that a particularly efficient material is a glass body having an intricate network of minute intercommunicating voids and channels running therethrough. Such glass bodies are well known and are disclosed in U.S. Patent 2,106,744, issued to H. P. Hood and M. E. Nordberg. Such glass, which will hereinafter be referred to as "porous glass," has properties which render it particularly suitable for use as an iodine-absorbing medium. Among such properties are its inertness, its small pore diameter, which varies between 20 and 100 angstrom units with an average of approximately 40, its extremely high surface area, which varies between about 150-200 m.$^2$ per gm., and its high percentage of void space, which comprises about 28% of its volume.

Figure 1:
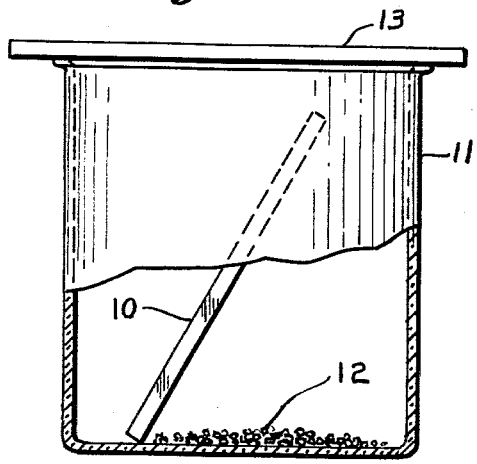
Fig. 1 illustrates the step of supplying iodine vapors to a plate of porous glass.

The process whereby porous glass is impregnated with iodine vapors and utilized in developing latent fingerprints is illustrated in the drawings. In Fig. 1 there is shown plate 10, which comprises porous glass, placed in beaker 11. Crystals 12 of solid iodine are placed in the beaker and allowed to sublime. The resultant vapors are prevented from escaping from the beaker by means of glass cover 13. The vapors fill the beaker and are absorbed into the pores of glass plate 10. Heat may be applied to accelerate sublimation. When a plate of porous glass having dimensions of 9" x 12" x ¼" is employed, saturation is effected within approximately 48 hours.

Figure 2:
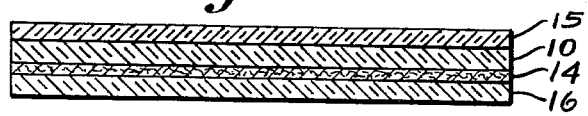
Fig. 2 illustrates the use of a plate of impregnated porous glass in developing latent fingerprints on a sheet of paper.

Plate 10 having been impregnated with iodine vapors, it is placed in contact with a sheet of paper 14, suspected of having fingerprints thereon, as illustrated in FIG 2. Nonporous glass plates 15 and 16 are preferably, although not necessarily, utilized in order to confine the vapors and prevent any substantial quantities from being released into the atmosphere. Exposure of the paper to the vapors from the impregnated porous glass continues for approximately one minute.

Figure 3:
FIG. 3 illustrates the use of small particles of impregnated porous glass scattered over a sheet of paper for developing prints thereon.

As an alternative, granular particles 17 of porous glass may be impregnated by the same process and subsequently spread over surface 18 suspected of having latent prints thereon, as illustrated in FIG 3. Such particles are particularly effective for use in detecting prints on uneven surfaces, and may be prepared by grinding porous glass to a particle size of, for example, approximately 40–50 mesh and maintaining the particles in proximity with iodine for times sufficient to effect impregnation, for example, 24 hours for small quantities of porous glass in close proximity with the iodine.

Prints developed through the use of iodine-impregnated porous glass are particularly clear and uniform due to the uniform and continuous release of vapors over the entire specimen.

A particular advantage of the present process is the fact that impregnated porous glass may be stored in compact hermetic containers for indefinite periods of time with no deterioration in effectiveness. Thus a supply of such material may be kept on hand and used immediately when needed.

Although porous glass has been found to be a particularly efficient material for the controlled release of iodine vapors, other inert porous materials, for example silica gel, may be utilized in the process of the present invention. Accordingly, it is intended that the present invention be limited not to the specific example given herein as a preferred embodiment but rather only by the scope of the appended claims.

What is claimed is:

1. The method of testing a surface for prints which comprises the steps of exposing porous glass to iodine vapor for a time sufficient to cause a substantial amount of said vapor to be absorbed by said glass and subsequently bringing into close proximity said glass and said surface to expose said surface to iodine vapor released by said glass.

2. The method according to claim 1 wherein said porous glass is in the form of a thin, flat plate.

3. The method according to claim 1 wherein said porous glass is in granular form.

4. The method of testing a surface for latent prints which comprises bringing said surface into close proximity with porous glass which has iodine absorbed therein in order to expose said surface to iodine vapor released from said porous glass.

5. The method of producing a material useful in developing latent fingerprints which comprises exposing porous glass to iodine vapor for a time sufficient to cause a substantial amount of said vapor to be absorbed by said glass.

6. A material useful for the controlled release of iodine vapor which comprises porous glass having iodine absorbed therein.

7. A material according to claim 6 which is in the form of a thin, flat plate.

8. A material according to claim 6 which is in granular form.

References Cited by the Examiner

UNITED STATES PATENTS 2,995,464   8/1961   Gundlach _____ 117—106

OTHER REFERENCES

"Fumes Help Expose Latent Fingerprints," Article in Washington Daily News, Saturday, July 25, 1936 (next to last page).

RICHARD D. EVANS, *Primary Examiner*.